US012391055B2

(12) United States Patent
Ikeya

(10) Patent No.: US 12,391,055 B2
(45) Date of Patent: Aug. 19, 2025

(54) PRINTING APPARATUS AND CONTROL METHOD FOR PRINTING APPARATUS

(71) Applicant: SEIKO EPSON CORPORATION, Tokyo (JP)

(72) Inventor: Taichi Ikeya, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 198 days.

(21) Appl. No.: 18/447,172

(22) Filed: Aug. 9, 2023

(65) Prior Publication Data

US 2024/0051315 A1 Feb. 15, 2024

(30) Foreign Application Priority Data

Aug. 10, 2022 (JP) ................................ 2022-127862

(51) Int. Cl.

| | |
|---|---|
| ***B41J 15/04*** | (2006.01) |
| ***B41F 17/13*** | (2009.01) |
| ***B41J 11/42*** | (2006.01) |
| ***B41J 15/00*** | (2006.01) |
| ***B65H 20/24*** | (2006.01) |
| *B41F 13/02* | (2006.01) |
| *B41F 33/16* | (2006.01) |

(52) U.S. Cl.

CPC ............ *B41J 15/042* (2013.01); *B41F 17/13* (2013.01); *B41J 11/42* (2013.01); *B41J 11/425* (2013.01); *B41J 15/005* (2013.01); *B65H 20/24* (2013.01); *B41F 13/02* (2013.01); *B41F 33/16* (2013.01); *B65H 2801/03* (2013.01)

(58) Field of Classification Search

CPC ........ B41J 15/042; B41J 11/42; B41J 11/425; B41J 15/005; B41F 17/13; B41F 13/02; B41F 33/16; B65H 20/24; B65H 2801/03

See application file for complete search history.

(56) References Cited

U.S. PATENT DOCUMENTS

| | | | | |
|---|---|---|---|---|
| 6,412,902 | B2 * | 7/2002 | Matsumoto | B41J 2/01 347/19 |
| 9,487,037 | B2 * | 11/2016 | Shiode | B41J 13/0009 |
| 2021/0339541 | A1 * | 11/2021 | Takahashi | B41J 11/0095 |
| 2023/0126527 | A1 * | 4/2023 | Shimizu | B41J 3/4078 73/584 |
| 2023/0302832 | A1 * | 9/2023 | Kojima | B41J 11/007 |

FOREIGN PATENT DOCUMENTS

| | | |
|---|---|---|
| JP | 2013-028415 A | 2/2013 |

* cited by examiner

*Primary Examiner* — Henok D Legesse

(74) *Attorney, Agent, or Firm* — WORKMAN NYDEGGER

(57) ABSTRACT

A printing apparatus includes: a printing unit; a feeding roller that feeds a print medium; a feeding-side movable roller that applies tension to the print medium, in a feeding-side buffer region positioned between the feeding roller and the printing unit; a front drive roller that is positioned between the feeding-side buffer region and the printing unit and with which the print medium is intermittently transported; and a control unit that controls feeding by the feeding roller. Control amounts controlled by the control unit include a feeding amount and a feeding speed of the feeding by the feeding roller. The control unit is configured to execute and switch between a print mode and a continuous transport mode, controls the feeding amount of the feeding roller when the print mode is executed, and controls the feeding speed of the feeding roller when the continuous transport mode is executed.

11 Claims, 9 Drawing Sheets

15b

| POSITION | DETECTION STATE | CONTROL VALUE OF FEEDING AMOUNT | CONTROL VALUE OF FEEDING SPEED |
|---|---|---|---|
| HE | Su5_ON | TRANSPORT STOP | TRANSPORT STOP |
| HP2 | None | + 200 [mm] | + 10 [%] |
| HP1 | Su4_ON | + 100 [mm] | + 5 [%] |
| TYP | Su4_ON | 0 [mm] | 0 [%] |
| | Su3_ON | | |
| LP1 | Su3_ON | − 100 [mm] | − 5 [%] |
| LP2 | Su2_ON | − 200 [mm] | − 10 [%] |
| LE | Su2_ON | TRANSPORT STOP | TRANSPORT STOP |
| | Su1_ON | | |

FIG. 7

15c

| POSITION | DETECTION STATE | CONTROL VALUE OF WINDING AMOUNT | CONTROL VALUE OF WINDING SPEED |
|---|---|---|---|
| HE | Sd5_ON | TRANSPORT STOP | TRANSPORT STOP |
| HP2 | Sd4_ON | − 200 [mm] | − 10 [%] |
| HP1 | Sd4_ON<br>Sd3_ON | − 100 [mm] | − 5 [%] |
| TYP | Sd3_ON<br>Sd2_ON | 0 [mm] | 0 [%] |
| LP1 | Sd2_ON | + 100 [mm] | + 5 [%] |
| LP2 | None | + 200 [mm] | + 10 [%] |
| LE | Sd1_ON | TRANSPORT STOP | TRANSPORT STOP |

FIG. 8

PRINTING APPARATUS AND CONTROL METHOD FOR PRINTING APPARATUS

The present application is based on, and claims priority from JP Application Serial Number 2022-127862, filed Aug. 10, 2022, the disclosure of which is hereby incorporated by reference herein in its entirety.

BACKGROUND

1. Technical Field

The present disclosure relates to a printing apparatus and a control method for a printing apparatus.

2. Related Art

In the related art, with respect to a recording apparatus that performs recording on a medium with a recording unit, a configuration in which a buffer region is provided on the path through which a recording medium wound in a roll shape is supplied to the recording unit is known (for example, refer to JP-A-2013-28415). The configuration disclosed in JP-A-2013-28415 includes a dancer roller that applies tension to a sheet as a recording medium, and the dancer roller is displaced in accordance with a change in the length of the sheet in the buffer region.

Apparatuses that perform recording or printing are required to be improved in printing speed. As one method for improving the printing speed, it is conceivable to increase a medium transport speed. However, if a transport speed is increased for an apparatus including such a dancer roller as disclosed in JP-A-2013-28415, there is concern that the responsiveness of the dancer roller will become lower. In order to prevent such a situation, the transport speed needs to be finely controlled in accordance with positions of the dancer roller, and thus an action such as increasing the number of sensors need to be taken.

SUMMARY

An aspect of the disclosure is a printing apparatus including: a printing unit configured to form an image on a print medium, a feeding roller configured to feed the print medium toward the printing unit, a feeding-side movable roller in a feeding-side buffer region positioned between the feeding roller and the printing unit, the feeding-side movable roller being configured to apply tension to the print medium, a front drive roller that is positioned between the feeding-side buffer region and the printing unit and with which the print medium is intermittently transported, and a control unit configured to control feeding by the feeding roller, in which control amounts controlled by the control unit include a feeding amount and a feeding speed of the feeding by the feeding roller, and the control unit is configured to execute and switch between a print mode and a continuous transport mode, controls the feeding amount of the feeding roller when the print mode is executed, and controls the feeding speed of the feeding roller when the continuous transport mode is executed.

Another aspect of the disclosure is a control method for controlling a print apparatus, the print apparatus including: a printing unit configured to form an image on a print medium, a feeding roller configured to feed the print medium toward the printing unit, a feeding-side movable roller in a feeding-side buffer region positioned between the feeding roller and the printing unit, the feeding-side movable roller being configured to apply tension to the print medium, and a front drive roller that is positioned between the feeding-side buffer region and the printing unit and with which the print medium is intermittently transported, the control method including: executing and switching between a print mode and a continuous transport mode, controlling a feeding amount in feeding by the feeding roller when the print mode is executed, and controlling a feeding speed in the feeding by the feeding roller when the continuous transport mode is executed.

BRIEF DESCRIPTION OF THE DRAWINGS

FIG. 7 is a schematic diagram showing an example of information stored in a control device.

FIG. 8 is a schematic diagram showing an example of information stored in the control device.

DESCRIPTION OF EMBODIMENTS

1. Overall Configuration of Printing Apparatus

Embodiments of the disclosure will be described below with reference to the accompanying drawings.

Figure 1:
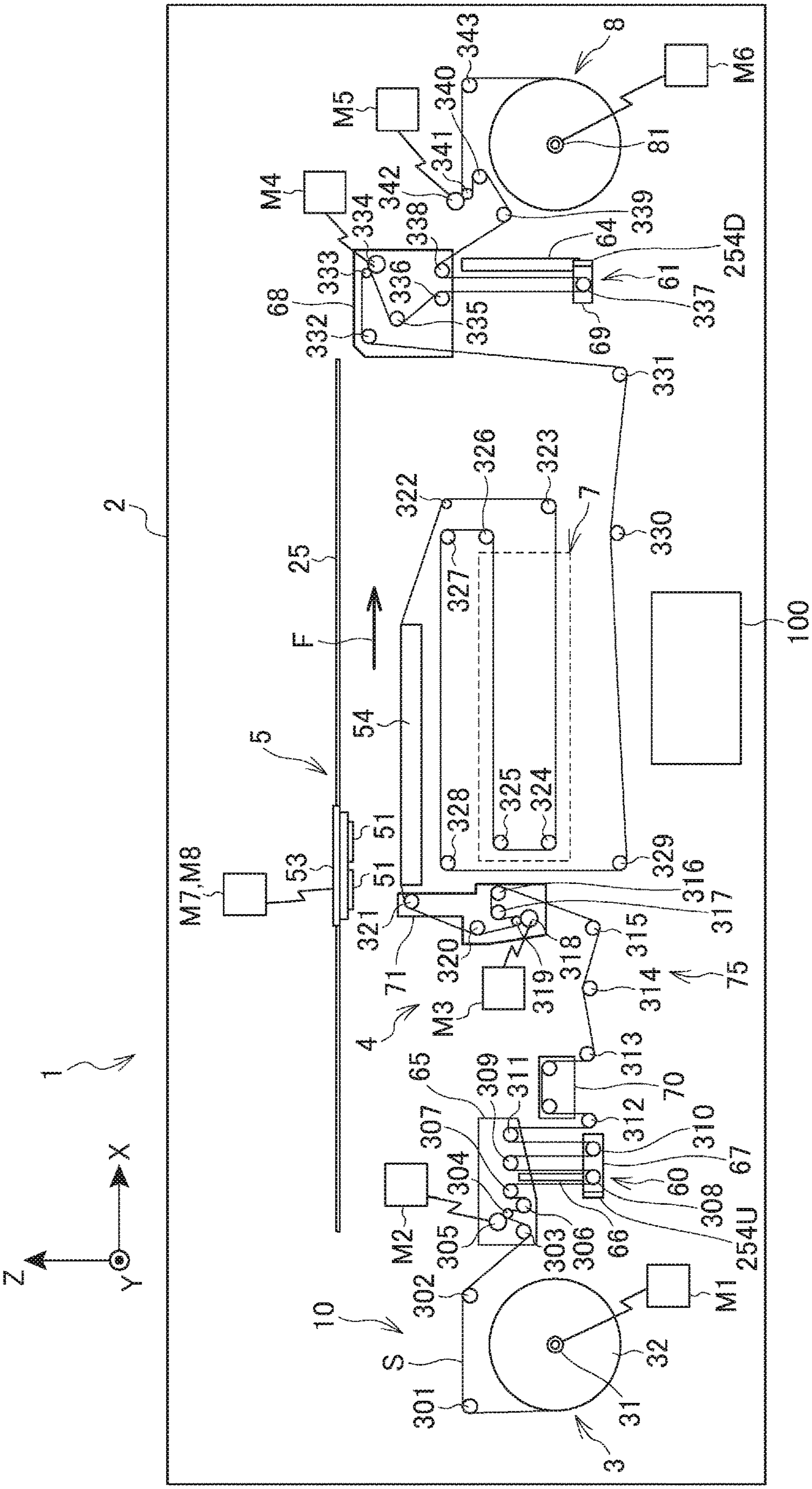
FIG. 1 is a diagram illustrating an overview of a printing apparatus according to the present embodiment.

FIG. 1 is a schematic diagram illustrating an overall configuration of a printing apparatus 1. In FIG. 1 and the drawings described below, XYZ orthogonal coordinates are illustrated in order to describe directions in a state in which the printing apparatus 1 is installed. The Z axis indicates a vertical direction in the state in which the printing apparatus 1 is installed, and can be referred to as a height direction. The X axis indicates a left-right direction of the printing apparatus 1. The Y axis is a direction orthogonal to the X axis, and can be referred to as a front-rear direction.

The printing apparatus 1 performs printing on a print medium S with a printing unit 5. Various types of sheets can be used as the print medium S used in the printing apparatus 1. The following description introduces a configuration in which label paper formed by placing labels with an adhesive backing on release paper and winding the paper in a roll shape is used as the print medium S. Although a printing method of the printing apparatus 1 is not limited, in the embodiment, an inkjet printer that ejects ink to the print medium S with the printing unit 5 is described as an example of the printing apparatus 1.

The printing apparatus 1 has a configuration in which a medium supply unit 3, the printing unit 5, a drying unit 7, a medium collection unit 8, and a control device 100 are disposed in a housing 2. The housing 2 is attached to a frame of the printing apparatus 1, which is not illustrated, and accommodates the above-described units.

The print medium S is transported between the medium supply unit 3 and the medium collection unit 8, and a transport path of the print medium S is indicated by reference sign 10. A plurality of transport rollers 301 to 343 that come into contact with the print medium S are disposed in the transport path 10. The print medium S supplied from the medium supply unit 3 is transported in the transport direction indicated by the arrow F in the drawing in the transport path 10. The transport rollers 301 to 321 are positioned upstream of the printing unit 5 in the transport path 10. On the other hand, the transport rollers 322 to 343 are positioned downstream of the printing unit 5.

The printing apparatus 1 includes motors M1 to M6, and the motors M1 to M6 generate a driving force for transporting the print medium S. The feeding motor M1 drives the supply shaft 31 of the medium supply unit 3, the feeding nip motor M2 drives the transport roller 305, and the supply nip motor M3 drives the transport roller 318. These motors M1, M2, and M3 are for supply-side power for supplying the print medium S from the medium supply unit 3 to the printing unit 5. On the other hand, a discharge nip motor M4 drives the transport roller 334, the winding nip motor M5 drives the winding transport roller 342, and the winding motor M6 drives a winding shaft 81 of the medium collection unit 8. These motors M4, M5, and M6 are for collection-side power for collecting the print medium S on which printing was performed by the printing unit 5 to the medium collection unit 8.

The medium supply unit 3 includes the cylindrical or columnar supply shaft 31. A roll body 32 on which the print medium S is wound in a roll shape can be mounted on the supply shaft 31, and the medium supply unit 3 supports the roll body 32 with the supply shaft 31. The supply shaft 31 is rotated by the power of the motor M1 to feed the print medium S from the roll body 32 toward the printing unit 5.

The printing unit 5 prints characters and images on the label of the print medium S by ejecting ink toward the print medium S. These characters and images are collectively referred to as images. The printing unit 5 includes a platen 54, a plurality of ejection heads 51 that eject ink, and a carriage 53 that holds the ejection heads 51. An image is formed at the print surface of the print medium S with ink ejected to the print medium S by the ejection head 51. The platen 54 includes a rectangular surface arranged to be parallel to the XY plane. The platen 54 includes, for example, a rectangular flat surface and is parallel to the XY plane in the installation state of the printing apparatus 1. The platen 54 supports the print medium S from below. A suction hole or the like for holding the print medium S on the platen 54 by applying suction force to the print medium S may be formed in the platen 54. The platen 54 corresponds to an example of a support part.

The carriage 53 is disposed above the platen 54 to face the platen 54. The carriage 53 is capable of reciprocating in the X-axis direction along a first guide rail 25 installed in the printing apparatus 1 in the X-axis direction. The carriage 53 is capable of reciprocating in the Y-axis direction along a second guide rail, which is not illustrated, installed in the Y-axis direction. The printing apparatus 1 includes a first carriage motor M7 that moves the carriage 53 along the first guide rail 25 and a second carriage motor M8 that moves the carriage 53 along the second guide rail. The printing apparatus 1 moves the ejection head 51 in the X-axis direction and the Y-axis direction with power of the motors M7 and M8. With this configuration, the ejection head 51 can move over the print medium S supported by the platen 54 in the X-axis direction and the Y-axis direction to eject ink to the entire print medium S.

When printing is performed on the print medium S, the printing apparatus 1 intermittently transports the print medium S. That is, the printing apparatus 1 transports the print medium S to the platen 54 and stops the transport of the print medium S in a state in which the print medium S is disposed in a predetermined region of the platen 54. Here, the printing unit 5 causes the ejection head 51 to eject ink while moving the ejection head 51 in the X-axis direction and the Y-axis direction to perform printing on the print medium S. After printing, the printing apparatus 1 transports the print medium S until the printed portion of the print medium S moves downstream of the platen 54. Then, the printing apparatus 1 stops the transport of the print medium S and performs printing with the printing unit 5.

A feeding-side buffer unit 60 and a meandering correction unit 70 that corrects meandering of the print medium S are disposed between the medium supply unit 3 and the printing unit 5 in the transport path 10. A configuration of the feeding-side buffer unit 60 will be described later.

The meandering correction unit 70 includes transport rollers 312 and 313, and corrects meandering of the print medium S between the transport rollers 312 and 313. Meandering of the print medium S is a phenomenon in which the transport direction of the print medium S is inclined from the transport path 10 to a direction along the Y axis. An ideal transport state is, for example, a state in which the print medium S is transported from the medium supply unit 3 to the platen 54 without moving in a direction along the Y axis. In this state, the print medium S fed out from the medium supply unit 3 moves along the X axis and reaches the platen 54, without moving in a direction along the Y axis. However, the print medium S may be inclined with respect to the X axis due to the influence of an inclination of the transport rollers 303 to 311, or the like. The state of such an inclination is called meandering. When the movement direction of the print medium S is a direction in which the print medium is inclined with respect to the X axis, the meandering correction unit 70 corrects the movement direction. The print medium S transported from the meandering correction unit 70 toward the platen 54 is in a state in which meandering is substantially eliminated.

A meandering accuracy maintenance region 75 for maintaining the meandering accuracy of the print medium S is provided between the meandering correction unit 70 and the platen 54. The meandering accuracy indicates a degree of meandering of the print medium S, that is, a degree of movement thereof in a direction intersecting the X axis, and may be referred to as transport accuracy. The transport rollers 313, 314, 315, 316, 317, 318, 319, 320, and 321 are disposed in the meandering accuracy maintenance region 75.

The transport rollers 313 and 314 are directly or indirectly attached to the frame of the printing apparatus 1. The transport rollers 313 and 314 are rotatably supported. A vertical plate 71 fixed directly or indirectly to the frame of the printing apparatus 1 is disposed in the meandering accuracy maintenance region 75. The transport roller 315 is rotatably supported at a lower end part of the vertical plate 71. In addition, the six transport rollers 316, 317, 318, 319, 320, and 321 are disposed at the central and upper parts of the vertical plate 71. Each of the transport rollers 316 to 321 is rotatably supported by the vertical plate 71. In the meandering accuracy maintenance region 75, tension is applied to the print medium S being transported. This tension prevents the print medium S from wrinkling or sagging. The print medium S is transported to the platen 54 through the meandering accuracy maintenance region 75. A configuration including the first transport rollers 313 to 321 and the vertical plate 71 disposed in the meandering accuracy maintenance region 75 is referred to as a first transport roller unit 4. A configuration of the first transport roller unit 4 will be described below.

The transport rollers 316 to 321 disposed in the meandering accuracy maintenance region 75 transport the print medium S while maintaining the meandering accuracy corrected by the meandering correction unit 70.

The drying unit 7 is disposed downstream of the printing unit 5 in the transport path 10. Transport rollers 322, 323, 324, 325, and 326 are disposed in the drying unit 7. The drying unit 7 includes a heater that heats the printing surface and/or the back of the printing surface of the print medium S, and dries the ink ejected by the printing unit 5.

Transport rollers 327, 328, 329, and 330 are disposed downstream of the drying unit 7 in the transport path 10. These transport rollers 327 to 330 are disposed in a winding-side buffer unit 61. The winding-side buffer unit 61 will be described below.

2. Configuration of Feeding-Side Buffer Unit

The feeding-side buffer unit 60 includes a feeding-side fixed plate 65 that is directly or indirectly fixed to the frame of the printing apparatus 1 and a feeding-side movable plate 67 that can move up and down. The seven transport rollers 303, 304, 305, 306, 307, 309, and 311 are rotatably supported by the feeding-side fixed plate 65. The two transport rollers 308 and 310 are rotatably supported by the feeding-side movable plate 67. These transport rollers 308 and 310 correspond to examples of a feeding-side movable roller. The feeding-side buffer unit 60 corresponds to an example of a feeding-side buffer region.

In the feeding-side buffer unit 60, the print medium S is wound around each of the transport rollers 303 to 311.

The transport rollers 303, 304, 305, 306, 307, 309, and 311 are supported by the feeding-side fixed plate 65 not to move in the transport path 10. On the other hand, the transport rollers 308 and 310 are movable up and down together with the feeding-side movable plate 67. The transport rollers 308 and 310 and the feeding-side movable plate 67 are in a state of being suspended from the feeding-side fixed plate 65 by the print medium S.

The feeding-side buffer unit 60 applies tension to the print medium S in the direction of gravity due to the weights of the feeding-side movable plate 67 and the transport rollers 308 and 310 attached to the feeding-side movable plate 67.

When slack occurs in the print medium S between the medium supply unit 3 and the platen 54, the feeding-side movable plate 67 is lowered by an amount corresponding to the slack of the print medium S, thereby absorbing the slack of the print medium S. In addition, when strong tension is applied to the print medium S in the transport direction between the medium supply unit 3 and the platen 54, the print medium S is fed from the feeding-side buffer unit 60 by the feeding-side movable plate 67 being raised by the tension. In this way, the feeding-side buffer unit 60 absorbs or alleviates the extra portion of the print medium S and excessive tension attributable to a shortage of the print medium S between the medium supply unit 3 and the platen 54.

Slack of the print medium S in the feeding-side buffer unit 60 varies depending on the difference between the rotation amount and the rotation speed of the transport roller 318 and the rotation amount and the rotation speed of feeding-side transport rollers that feed the print medium S from the medium supply unit 3. The feeding-side transport rollers may include at least the supply shaft 31 out of the supply shaft 31 and the transport roller 305, and may be both the supply shaft 31 and the transport roller 305. The feeding-side transport rollers are an example of a feeding roller.

A length of the print medium S that is supplied to the platen 54 at one transport operation in intermittent transport by the printing apparatus 1 is determined in accordance with the specification of the printing apparatus 1. For this reason, a rotation amount by which the transport roller 318 operates is determined in one transport operation of the intermittent transport. In addition, a rotation speed of the transport roller 318 is determined in accordance with the printing speed of the printing apparatus 1. Thus, the transport amount and the transport speed of the transport roller 318, that is, the operation amount and the rotation speed of the supply nip motor M3, are determined in advance. The transport roller 318 corresponds to an example of a front drive roller.

On the other hand, a rotation amount of the feeding-side transport rollers and a rotation speed of the feeding-side transport rollers can be changed by control of the control device 100. Hereinafter, a rotation amount of the feeding-side transport roller will be referred to as a feeding amount, and a rotation speed of the feeding-side transport roller will be referred to as a feeding speed. When the printing apparatus 1 performs printing, if the feeding amount is larger than the transport amount of the transport roller 318 in intermittent transport, slack of the print medium S in the feeding-side buffer unit 60 is large, and thus the feeding-side movable plate 67 is lowered. In addition, if the feeding amount is smaller than the transport amount of the transport roller 318, the feeding-side movable plate 67 is raised. In addition, in a state in which the feeding-side movable plate 67 is at a proper position in the up-down direction, the amount of slack of the print medium S is appropriate, and thus the print medium S can be stably transported.

The printing apparatus 1 controls the rotation amount and/or the rotation speed of the feeding motor M1 that drives the supply shaft 31 and the feeding nip motor M2 that drives the transport roller 305 so that the amount of slack of the print medium S in the feeding-side buffer unit 60 becomes appropriate. In addition, the printing apparatus 1 includes a plurality of feeding-side sensors 141 for detecting the height of the feeding-side movable plate 67 in order to maintain the proper amount of slack of the print medium S in the feeding-side buffer unit 60. The feeding-side sensors 141 correspond to an example of first sensors.

Figure 2:
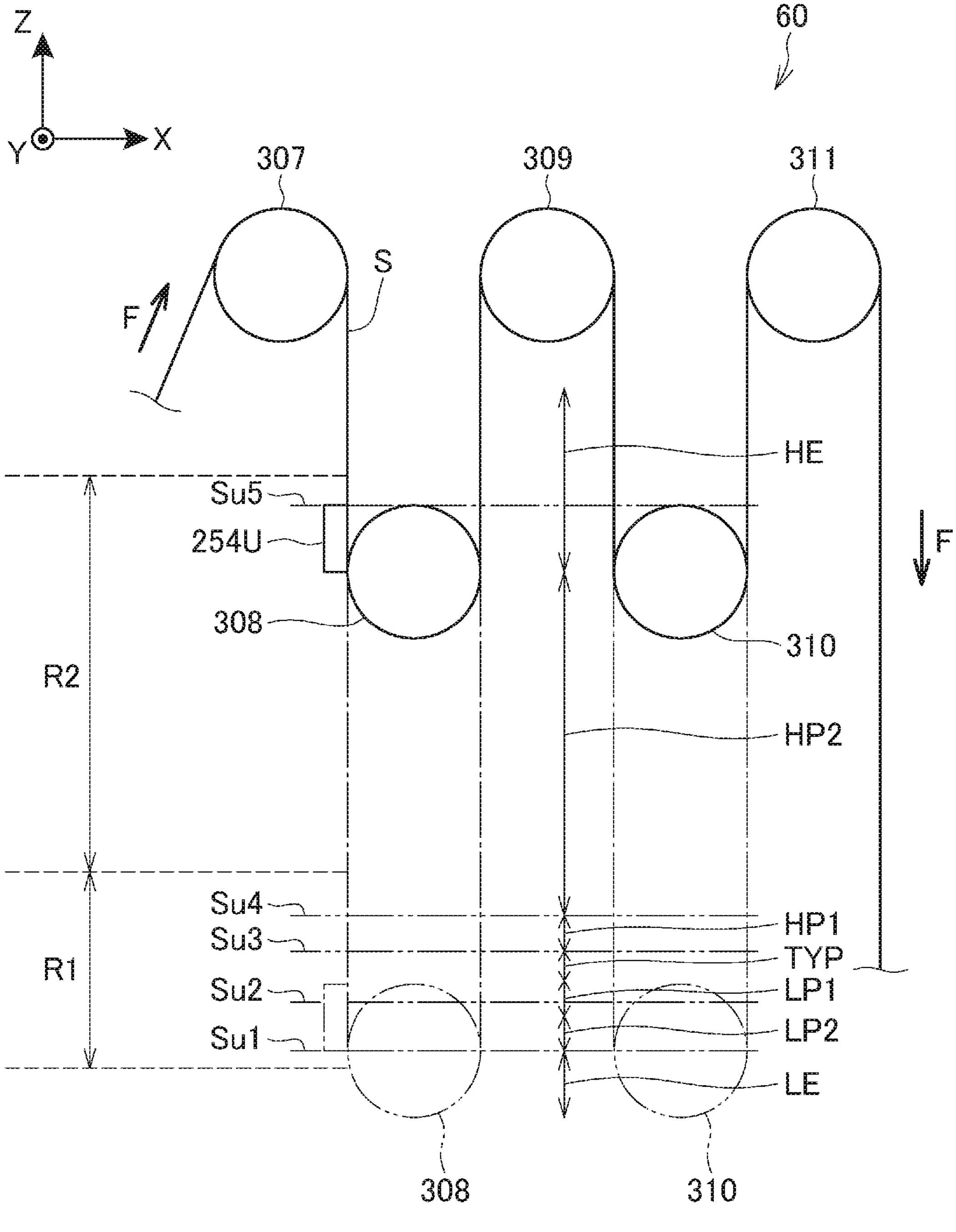
FIG. 2 is a schematic diagram illustrating a configuration of the main part of a feeding-side buffer unit.

FIG. 2 is a schematic diagram illustrating a configuration of the main part of the feeding-side buffer unit 60. In FIG. 2, the transport rollers 307, 308, 309, 310, and 311 and detection positions of the feeding-side sensors 141 installed in the feeding-side buffer unit 60 are illustrated. The printing apparatus 1 according to the present embodiment includes five feeding-side sensors 141*a*, 141*b*, 141*c*, 141*d*, and 141*e* in the feeding-side buffer unit 60, and the feeding-side sensors will be referred to as feeding-side sensors 141 when there is no need to distinguish them from each other.

In FIG. 2, reference sign Su1 indicates a detection position of the feeding-side sensor 141*a*, and reference sign Su2 indicates a detection position of the feeding-side sensor 141*b*. Reference sign Su3 indicates a detection position of the feeding-side sensor 141*c*, reference sign Su4 indicates a detection position of the feeding-side sensor 141*d*, and reference sign Su5 indicates a detection position of the feeding-side sensor 141*e*.

Of the feeding-side sensors 141*a* to 141*e*, the feeding-side sensor 141*a* detects the feeding-side movable plate 67 at the lowest detection position Su1 in the movable range of the feeding-side movable plate 67 as illustrated in FIG. 2. On the other hand, the feeding-side sensor 141*e* detects the feeding-side movable plate 67 at the highest detection position Su5 in the movable range of the feeding-side movable plate 67. The detection positions Su2, Su3, and Su4 of the feeding-side sensors 141*b*, 141*c*, and 141*d* are between the detection position Su1 and the detection position Su5. The installation positions of the feeding-side sensors 141*a* to 141*e* are positions corresponding to the detection positions Su1 to Su5.

As will be described below, the proper position of the feeding-side movable plate 67 is a position where the feeding-side movable plate 67 is detected at both the detection position Su3 and the detection position Su4. A larger number of feeding-side sensors 141 are disposed in a range R1 including the proper position than in a range R2 outside the range R1. The range R1 is an example of a first range, and a range R4 is an example of a second range.

The feeding-side sensors 141 are for detecting the presence or absence of the feeding-side movable plate 67, and for example, transmission-type optical sensors or reflection-type optical sensors can be used. Switch-type sensors that come in contact with the feeding-side movable plate 67 may be used as the feeding-side sensors 141. Each of the feeding-side sensors 141*a* to 141*e* outputs a detection signal indicating whether the feeding-side movable plate 67 has been detected to the control device 100.

FIG. 2 illustrates a detection object 254U. The detection object 254U is a plate member for detection fixed to the feeding-side movable plate 67. The detection object 254U moves up and down together with the feeding-side movable plate 67 and passes through a position at which the detection light of the feeding-side sensors 141*a* to 141*e* is incident. In other words, the feeding-side sensors 141*a* to 141*e* detect the feeding-side movable plate 67 by detecting the detection object 254U.

When the interval between the adjacent feeding-side sensors 141 is shorter than the size of the detection object 254U in the up-down direction, the two feeding-side sensors 141 may simultaneously detect the detection object 254U. The control device 100 can acquire the detection state of each of the five feeding-side sensors 141*a* to 141*e*. Thus, the printing apparatus 1 can detect the position of the feeding-side movable plate 67 in many stages using the five feeding-side sensors 141*a* to 141*e*. The control device 100 can detect the position of the feeding-side movable plate 67 at five positions where any one of the feeding-side sensors 141*a* to 141*e* detects the detection object 254U. In addition, the position of the feeding-side movable plate 67 can be detected at a position where two adjacent feeding-side sensors 141 detect the detection object 254U. In addition, the position of the feeding-side movable plate 67 can be detected at one or two positions where none of the feeding-side sensors 141 detect the detection object 254U. In order to enable this fine detection, the interval between the feeding-side sensors 141 may be narrow; however, an increase in the number of the feeding-side sensors 141 leads to an increase in cost and the number of manufacturing steps of the printing apparatus 1. For this reason, a large number of feeding-side sensors 141 are disposed in the range R1 in the printing apparatus 1. Thus, the intervals between the adjacent feeding-side sensors 141 are narrow and the two adjacent feeding-side sensors 141 can simultaneously detect the feeding-side movable plate 67 in the range R1, and thus a fine position of the feeding-side movable plate 67 can be detected.

3. Configuration of Winding-Side Buffer Unit

Returning to FIG. 1, the winding-side buffer unit 61 includes a winding-side fixed plate 68 that is directly or indirectly fixed to the frame of the printing apparatus 1, and a winding-side movable plate 69 that can move up and down. Transport rollers 336 and 338 are rotatably supported by the winding-side fixed plate 68. A transport roller 337 is rotatably supported by the winding-side movable plate 69. The winding-side buffer unit 61 corresponds to an example of a winding-side buffer region.

The print medium S is wound around each of the transport rollers 336, 337, and 338 in the winding-side buffer unit 61. The transport rollers 336 and 338 are supported by the winding-side fixed plate 68 not to move in the transport path 10. On the other hand, the transport roller 337 can move up and down together with the winding-side movable plate 69. The transport roller 337 and the winding-side movable plate 69 are in a state of being suspended from the winding-side fixed plate 68 by the print medium S.

The winding-side buffer unit 61 applies tension to the print medium S in the direction of gravity by the weights of the winding-side movable plate 69 and the transport roller 337 attached to the winding-side movable plate 69. The transport roller 337 corresponds to an example of a winding-side movable roller.

When slack occurs in the print medium S between the platen 54 and the medium collection unit 8, the winding-side movable plate 69 is lowered by the amount of the slack of the print medium S to absorb the slack of the print medium S. In addition, when strong tension is applied to the print medium S in the transport direction between the platen 54 and the medium collection unit 8, the winding-side movable plate 69 is raised by the tension, and thus the print medium S is fed out from the winding-side buffer unit 61. In this way, the winding-side buffer unit 61 absorbs or alleviates the extra portion of the print medium S and excessive tension attributable to a shortage of the print medium S between the platen 54 and the medium collection unit 8.

Slack of the print medium S in the winding-side buffer unit 61 varies depending on the difference between the rotation amount and the rotation speed of the transport roller 334 and the rotation amount and the rotation speed of a winding-side transport rollers that wind the print medium S around the medium collection unit 8. The winding-side transport rollers may include at least the winding shaft 81 out of the winding shaft 81 and the winding transport roller 342, and may be both the winding shaft 81 and the winding transport roller 342. The winding-side transport rollers are an example of a winding roller.

A length of the print medium S that is supplied to the platen 54 at one transport operation in intermittent transport by the printing apparatus 1 is determined in accordance with the specification of the printing apparatus 1 as described above. For this reason, the rotation amount of the transport roller 334, which is the transport roller closest to the platen 54 downstream of the platen 54 in the transport path 10, is determined by one transport operation in the intermittent transport. The rotation speed of the transport roller 334 is determined in the same manner as the transport roller 318. Thus, the transport amount and the transport speed of the transport roller 334, that is, the operation amount and the rotation speed of the discharge nip motor M4, are determined in advance.

On the other hand, a rotation amount of the winding-side transport rollers and a rotation speed of the winding-side transport rollers can be changed by control of the control device 100. Hereinafter, a rotation amount of the winding-side transport rollers will be referred to as a winding amount, and a rotation speed of the winding-side transport rollers will be referred to as a winding speed. If a winding amount of the transport roller 334 is greater than a transport amount thereof in the intermittent transport when the printing apparatus 1 performs printing, the amount of slack of the print medium S in the winding-side buffer unit 61 is small, and thus the winding-side movable plate 69 is raised. In addition, if a winding amount of the transport roller 334 is smaller than a transport amount thereof, the winding-side movable plate 69 is lowered. In addition, in a state in which the winding-side movable plate 69 is at a proper position in the up-down direction, the amount of slack of the print medium S is appropriate, and thus the print medium S can be stably transported.

The printing apparatus 1 controls the rotation amount and/or the rotation speed of the winding motor M6 that drives the winding shaft 81 and the winding nip motor M5 that drives the winding transport roller 342 so that the amount of slack of the print medium S in the winding-side buffer unit 61 becomes appropriate. In addition, the printing apparatus 1 includes a plurality of winding-side sensors 151 for detecting the height of the winding-side movable plate 69 in order to maintain the proper amount of slack of the print medium S in the winding-side buffer unit 61. The winding-side sensors 151 correspond to an example of a second sensor.

Figure 3:
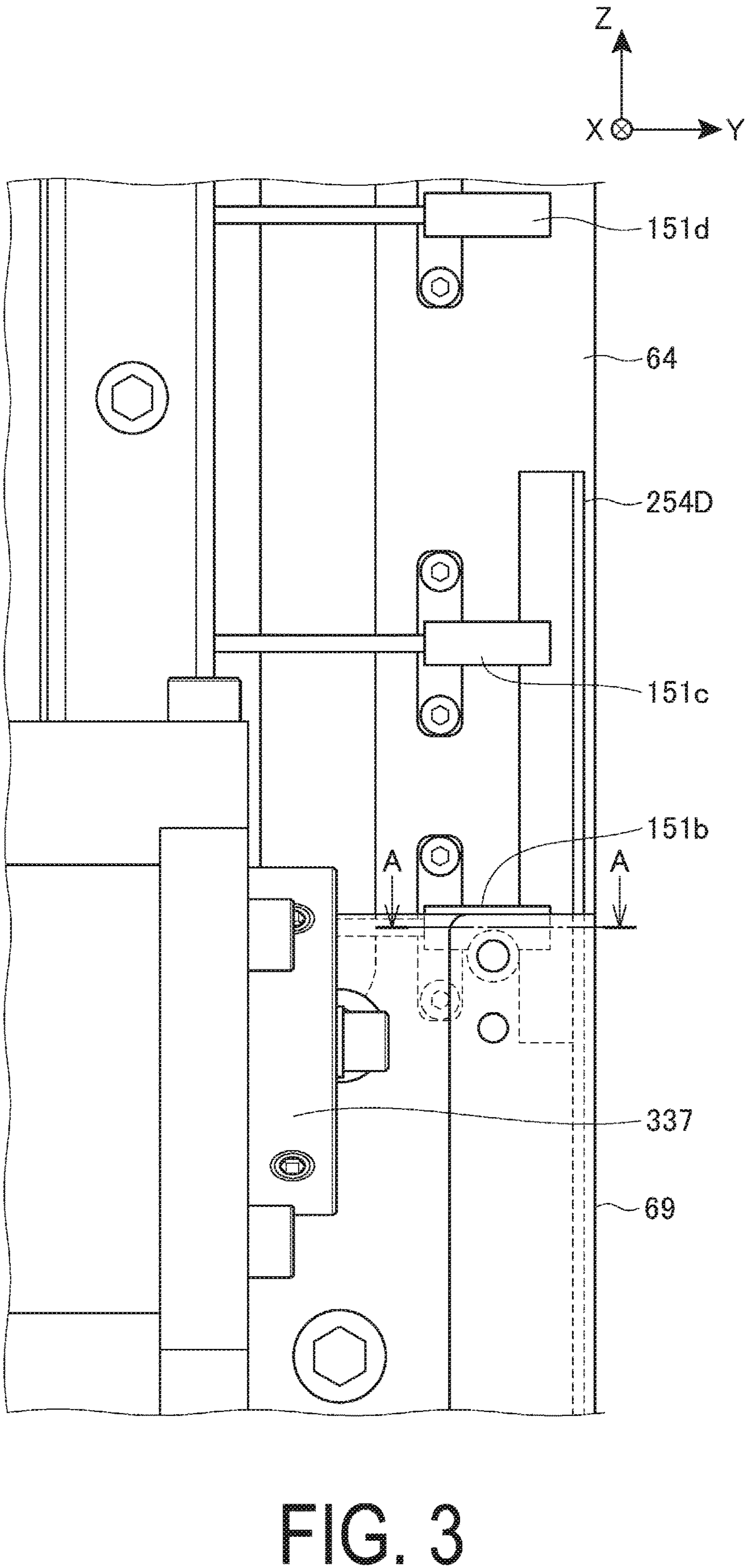
FIG. 3 is a side view illustrating a configuration of the main part of a winding-side buffer unit.
Figure 4:
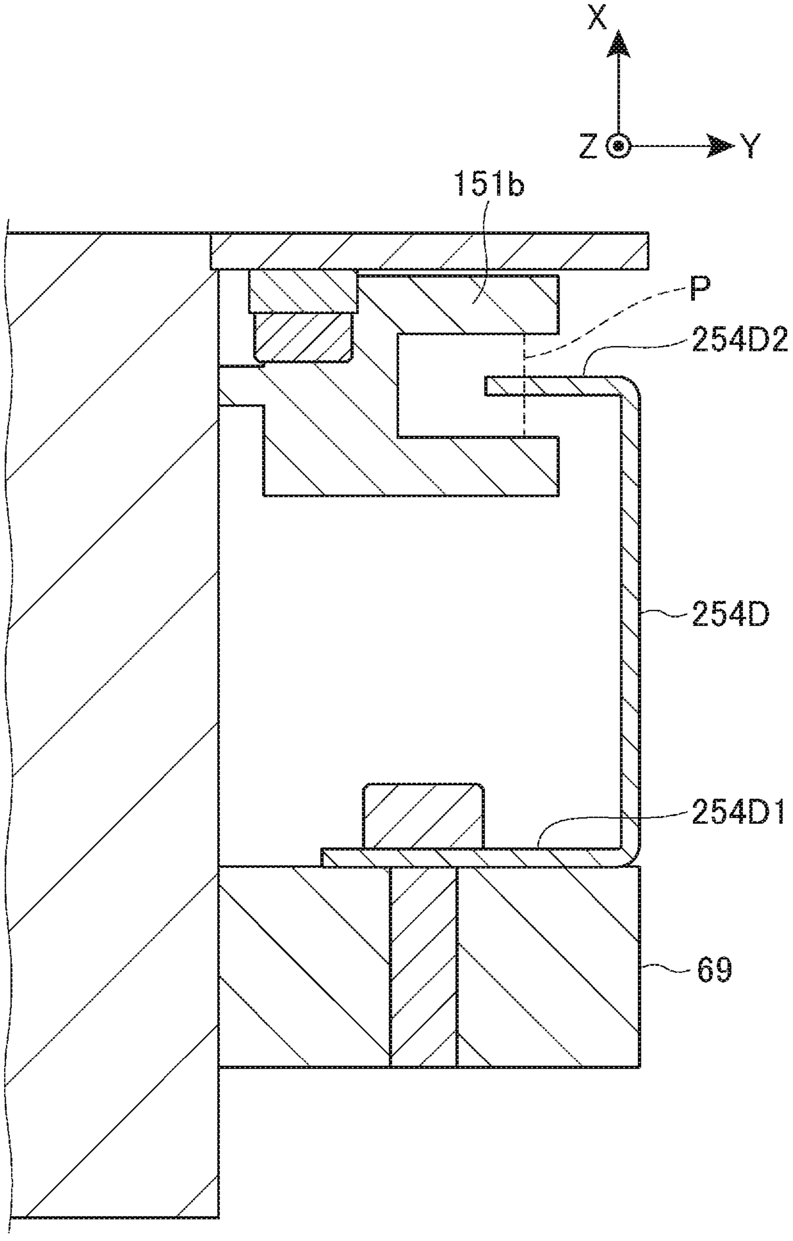
FIG. 4 is a cross-sectional view taken along line A-A in FIG. 3.
Figure 5:
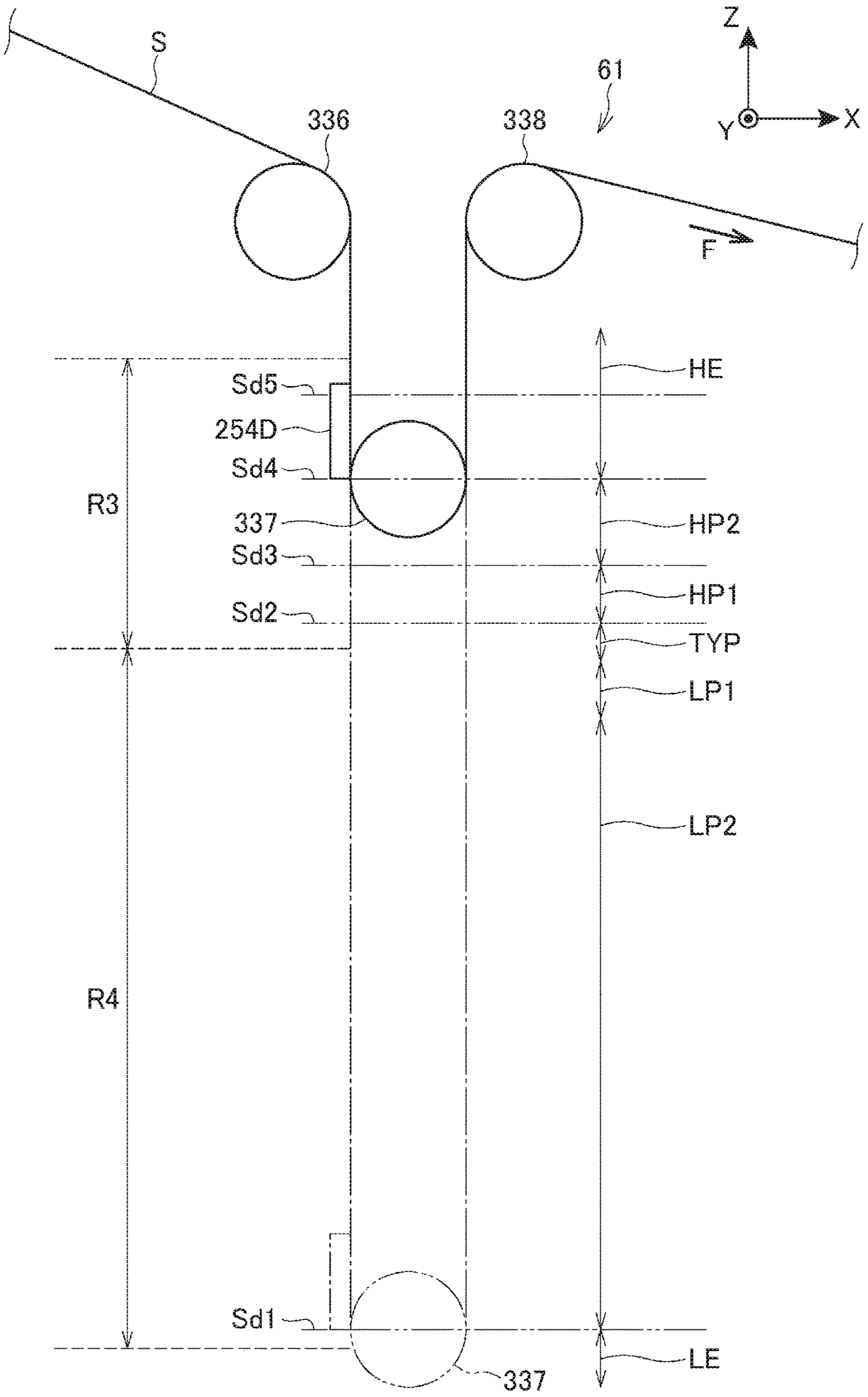
FIG. 5 is a schematic diagram illustrating a configuration of the main part of the winding-side buffer unit.

FIG. 3 is a side view illustrating a configuration of the main part of the winding-side buffer unit 61. FIG. 4 is a cross-sectional view taken along line A-A in FIG. 3. In addition, FIG. 5 is a schematic diagram illustrating a configuration of the main part of the winding-side buffer unit 61. FIG. 5 illustrates the transport rollers 336, 337, and 338 and detection positions of the winding-side sensors 151 installed in the winding-side buffer unit 61.

The printing apparatus 1 according to the present embodiment includes five winding-side sensors 151*a*, 151*b*, 151*c*, 151*d*, and 151*e* in the winding-side buffer unit 61, and the winding-side sensors will be referred to as winding-side sensors 151 when there is no need to distinguish them from each other.

In FIG. 5, reference sign Su1 indicates a detection position of the winding-side sensor 151*a*, and reference sign Su2 indicates a detection position of the winding-side sensor 151*b*. Reference sign Su3 indicates a detection position of the winding-side sensor 151*c*, reference sign Su4 indicates a detection position of the winding-side sensor 151*d*, and reference sign Su5 indicates a detection position of the winding-side sensor 151*e*.

The winding-side sensors 151 are for detecting the presence or absence of the winding-side movable plate 69, and for example, transmission-type optical sensors or reflection-type optical sensors can be used. Switch-type sensors that come in contact with the winding-side movable plate 69 may be used as the winding-side sensors 151. Each of the winding-side sensors 151*a* to 151*e* outputs a detection signal indicating whether the winding-side movable plate 69 has been detected to the control device 100.

FIG. 3 illustrates the vicinity of the winding-side sensors 151*b*, 151*c*, and 151*d*. The winding-side sensors 151*a* to 151*e* are fixed to a winding-side sensor mounting bar 64 which is fixed to the frame or the like of the printing apparatus 1. The winding-side sensors 151*a* to 151*e* are disposed at appropriate intervals in the up-down direction.

Furthermore, a detection object 254D is attached to the winding-side movable plate 69. The detection object 254D is a detection member fixed to the winding-side movable plate 69. The detection object 254D moves up and down together with the winding-side movable plate 69 and passes through a position P at which detection light of the winding-side sensors 151*a* to 151*e* is incident. That is, the winding-side sensors 151*a* to 151*e* detect the winding-side movable plate 69 by detecting the detection object 254D.

The configuration of the detection object 254D illustrated in FIG. 4 is an example, and this configuration can also be applied to the detection object 254U. The detection object 254D is a member having a C-shaped cross section, in which one side 254D1 of the detection object 254D is fixed to the winding-side movable plate 69 by a bolt. In addition, the other side 254D2 of the detection object 254D fits into a recess through which the detection light of the winding-side sensors 151 passes. When the side 254D2 fits into the recess of the winding-side sensors 151, the detection state of the winding-side sensors 151 is an ON state, and the winding-side movable plate 69 is detected.

In FIG. 5, reference sign Sd1 indicates a detection position of the winding-side sensor 151*a*, and reference sign Sd2 indicates a detection position of the winding-side sensor 151*b*. Reference sign Sd3 indicates a detection position of the winding-side sensor 151*c*, reference sign Sd4 indicates a detection position of the winding-side sensor 151*d*, and reference sign Sd5 indicates a detection position of the winding-side sensor 151*e*.

Of the winding-side sensors 151*a* to 151*e*, the winding-side sensor 151*a* detects the winding-side movable plate 69 at the lowest detection position Sd1 in the movable range of the winding-side movable plate 69 as illustrated in FIG. 5. On the other hand, the winding-side sensor 151*e* detects the winding-side movable plate 69 at the highest detection position Sd5 in the movable range of the winding-side movable plate 69. The detection positions Sd2, Sd3, and Sd4 of the winding-side sensors 151*b*, 151*c*, and 151*d* are between the detection position Sd1 and the detection position Sd5. The installation positions of the winding-side sensors 151*a* to 151*e* are positions corresponding to the detection positions Sd1 to Sd5.

As will be described later, the proper position of the winding-side movable plate 69 is a position at which the winding-side movable plate 69 is detected at both the detection position Sd2 and the detection position Sd3. A larger number of winding-side sensors 151 are disposed in a range R3 including the proper position than in a range R4 outside the range R3. The range R3 is an example of a first range, and the range R4 is an example of a second range.

When the interval between the adjacent winding-side sensors 151 is shorter than the size of the detection object 254D in the up-down direction, the two winding-side sensors 151 may simultaneously detect the detection object 254D. The control device 100 can acquire the detection state of each of the five winding-side sensors 151*a* to 151*e*. Thus, the printing apparatus 1 can detect the position of the winding-side movable plate 69 in many stages using the five winding-side sensors 151*a* to 151*e*. The control device 100 can detect the position of the winding-side movable plate 69 at five positions when any one of the winding-side sensors 151*a* to 151*e* detects the detection object 254D. In addition, the position of the winding-side movable plate 69 can be detected at a position where two adjacent winding-side sensors 151 detect the detection object 254D. In addition, the position of the winding-side movable plate 69 can be detected at one or two positions where none of the winding-side sensors 151 detect the detection object 254D. In order to enable this fine detection, the interval between the winding-side sensors 151 may be narrow; however, an increase in the number of the winding-side sensors 151 leads to an increase in cost and the number of manufacturing steps of the printing apparatus 1. For this reason, a large number of winding-side sensors 151 are disposed in the range R3 in the printing apparatus 1. Thus, the intervals between the adjacent winding-side sensors 151 are narrow and the two adjacent winding-side sensors 151 can simultaneously detect the winding-side movable plate 69 in the range R3, and thus a fine position of the winding-side movable plate 69 can be detected.

4. Configuration of Control System

Figure 6:
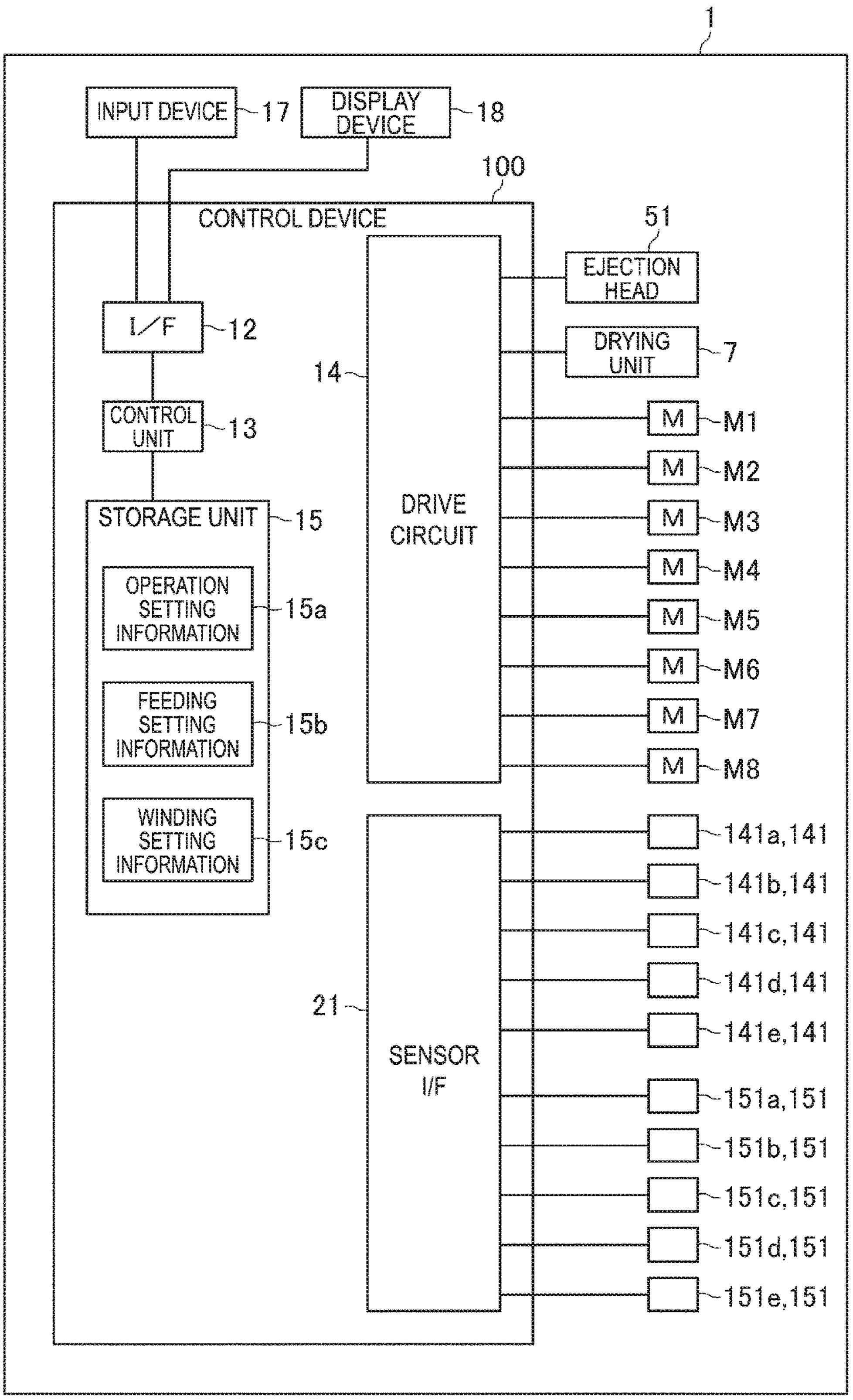
FIG. 6 is a block diagram illustrating a configuration of a control system of the printing apparatus.

FIG. 6 is a block diagram illustrating the control system of the printing apparatus 1.

The printing apparatus 1 includes an input device 17 and a display device 18, which are coupled to the control device 100. The input device 17 is a device through which an operator who operates the printing apparatus 1 inputs printing conditions and the like, and is, for example, an operation panel including switches. The input device 17 may be an input device such as a keyboard or a mouse, or may be a tablet computer, a portable terminal, or the like that is a separate body from the printing apparatus 1. The input device 17 outputs information input by the operator to the control device 100. The display device 18 includes a display screen such as a liquid crystal display panel, and displays various types of information under control of the control device 100. The printing apparatus 1 may include a touch panel in which the input device 17 and the display device 18 are integrated.

The control device 100 includes an interface unit 12, a control unit 13, a drive circuit 14, a storage unit 15, and a sensor interface 21. The control unit 13 includes a processor such as a CPU and causes the processor to execute a program to control each unit of the printing apparatus 1 in cooperation of software and hardware. CPU is an abbreviation for central processing unit. In the drawing, interface is abbreviated as I/F.

The interface unit 12 is coupled to the input device 17 and the display device 18, and transmits and receives data to and from these devices.

The drive circuit 14 is coupled to the feeding motor M1, the feeding nip motor M2, the supply nip motor M3, the discharge nip motor M4, the winding nip motor M5, and the winding motor M6. In addition, a first carriage motor M7 and a second carriage motor M8 are coupled to the drive circuit 14. The drive circuit 14 supplies a drive current to each of the motors M1 to M6 under control of the control unit 13 to cause the motors M1 to M6 to operate and transport the print medium S. In addition, the drive circuit 14 moves the carriage 53 by supplying a driving current to the first carriage motor M7 and the second carriage motor M8 according to control of the control unit 13.

The ejection head 51 and the drying unit 7 are coupled to the drive circuit 14. The drive circuit 14 outputs a control signal under control of the control unit 13 to cause the ejection head 51 to operate and form an image on the print medium S. In addition, the drive circuit 14 causes the heater of the drying unit 7 to operate to dry the print medium S according to control of the control unit 13.

The sensor interface 21 is coupled to the feeding-side sensors 141*a*, 141*b*, 141*c*, 141*d*, and 141*e* and the winding-side sensors 151*a*, 151*b*, 151*c*, 151*d*, and 151*e*. The sensor interface 21 acquires detection states of the feeding-side sensors 141 and the winding-side sensors 151 according to control of the control unit 13. For example, the sensor interface 21 supplies electric power for operation to each of the feeding-side sensors 141 and the winding-side sensors 151, and acquires a detection signal output by each of the feeding-side sensors 141 and the winding-side sensors 151. The sensor interface 21 outputs a detection state of each of the feeding-side sensors 141 and the winding-side sensors 151 to the control device 100.

The control device 100 controls the drive circuit 14 to drive the ejection head 51 and discharge the ink toward the print medium S. The control device 100 drives the first carriage motor M7 to move the carriage 53 in the X-axis direction. The control device 100 drives the second carriage motor M8 to move the carriage 53 in the Y-axis direction. The control device 100 repeatedly performs main scanning with the first carriage motor M7, the second carriage motor M8, and the ejection head 51, and sub-scanning with a transport motor 153, and intermittently transports the print medium S. In the main scanning, the control device 100 causes the carriage 53 to move while causing the ejection head 51 to eject ink while the transport of the print medium S is stopped. In the sub-scanning, the transport motor 153 is controlled such that the print medium S is transported in the transport direction F. With this control, an image is formed at the print medium S.

The control device 100 causes the drive circuit 14 to operate the motors M1 to M6 to intermittently drive the print medium S during printing. After transporting the print medium S by a preset transport amount, the control device 100 stops the print medium S and drives the first carriage motor M7, the second carriage motor M8, and the ejection head 51 to perform printing.

The control device 100 controls operation amounts and operation speeds of the motors M1 to M6 by adjusting the drive current supplied to the motors M1 to M6 by the drive circuit 14.

The storage unit 15 includes a semiconductor storage device and a magnetic recording device, and stores in a non-volatile manner programs to be executed by the processor of the control unit 13 and data to be processed by the control unit 13. The storage unit 15 stores operation setting information 15*a*, feeding setting information 15*b*, and winding setting information 15*c*.

The operation setting information 15*a* is information including settings related to an operation of each driving unit coupled to the drive circuit 14. The operation setting information 15*a* includes information indicating set values of the feeding amount and the feeding speed at which the print medium S is sent to the platen 54. That is, the operation setting information includes, for at least one of the feeding motor M1 or the feeding nip motor M2, the rotation speed and the rotation amount of the motors equivalent to the amount of one transport operation when the print medium S is intermittently transported. In addition, the operation setting information 15*a* includes information indicating set values of the winding amount and the winding speed at which the print medium S is wound from the platen 54. That is, the operation setting information includes, for at least one of the winding nip motor M5 or the winding motor M6, the rotation speed and the rotation amount of the motors equivalent to the amount of one transport operation when the print medium S is intermittently transported. The operation setting information 15*a* may include information indicating setting values of a rotation amount and a rotation speed of another motor.

The feeding setting information 15*b* is information in which the detection states of the feeding-side sensors 141*a*, 141*b*, 141*c*, 141*d*, and 141*e* are associated with the control amount of the feeding amount of the print medium S. In addition, the winding setting information 15*c* is information in which the detection states of the winding-side sensors 151*a*, 151*b*, 151*c*, 151*d*, and 151*e* are associated with a control amount of a winding speed.

FIG. 7 is a schematic diagram illustrating an example of information stored in the control device 100, and illustrates a configuration example of the feeding setting information 15*b*.

In the example illustrated in FIG. 7, the detection states of the feeding-side sensors 141*a* to 141*e* are indicated by the detection positions Su1 to Su5 being "ON". For example, detection of the feeding-side movable plate 67 by the feeding-side sensor 141*a* is expressed as Su1_ON. The case in which none of the feeding-side sensors 141*a* to 141*e* detect the feeding-side movable plate 67 is expressed as "None". In the feeding setting information 15*b*, positions of the winding-side movable plate 69 are divided into seven stages corresponding to the detection states of the feeding-side sensors 141*a* to 141*e*. These are the positions LE, LP2, LP1, TYP, HP1, HP2, and HE in ascending order.

The position LE is a position at which the detection position Su1 and the detection position Su2 are "ON". The position LP2 is a position at which only the detection position Su2 is "ON", and the position LP1 is a position at which only the detection position Su3 is "ON". The position TYP indicates a standard position of the feeding-side movable plate 67 and can be referred to as a reference position. The position TYP is a position at which the detection position Su3 and the detection position Su4 are "ON". The position HP1 is a position at which only the detection position Su4 is "ON", and the position HP2 is a position at which none of the detection positions Su detect the feeding-side movable plate 67. The position HE is a position at which only the detection position Su5 is "ON". The control device 100 can determine which of the positions LE, LP2, LP1, TYP, HP1, HP2, and HE the position of the feeding-side movable plate 67 is based on the detection states of the feeding-side sensors 141*a* to 141*e*.

The feeding setting information 15*b* includes, as a control value of the feeding amount, a value for adjusting the length of the print medium S transported in one transport operation in the intermittent transport. For example, when the feeding-side movable plate 67 is at the position LP2, the control device 100 reduces the feeding amount by 200 mm from the standard value or the current set value.

The feeding setting information 15*b* includes a value for adjusting the transport speed of the print medium S when intermittent transport is not performed as a control value of the feeding speed. For example, when the feeding-side movable plate 67 is at the position LP2, the control device 100 sets the feeding speed to be 10% slower than the standard value or the current set value. Here, the case in which intermittent transport is not performed is, for example, a case in which only transport of the print medium S is continuously performed for a predetermined time without performing printing on the print medium S, such as a case in which the roll body 32 of the medium supply unit 3 is replaced. An operation state in which this operation is performed is referred to as a continuous transport mode. On the other hand, an operation state in which the print medium S is intermittently transported in order to perform printing by the printing unit 5 is referred to as a print mode.

Furthermore, according to the feeding setting information 15*b*, a transport stop is set in association with each of the position LE and the position HE. A transport stop indicates that transport is immediately stopped during execution of the print mode or the continuous transport mode. For example, the feeding-side movable plate 67 is at an end of the movement range at the position LE or the position HE. In this case, even if the control device 100 adjusts the feeding amount or the feeding speed, there is concern that damage or contamination of the print medium S may occur before the effect of the adjustment is exhibited, and thus the transport of the print medium S may be stopped. In the feeding setting information 15*b*, transport is set to be stopped in any of the print mode and the continuous transport mode when the feeding-side movable plate 67 is at the position LE and it is at the position HE.

FIG. 8 is a schematic diagram illustrating an example of information stored in the control device 100, and illustrates a configuration example of the winding setting information 15*c*.

In the example illustrated in FIG. 8, the detection states of the winding-side sensors 151*a* to 151*e* are indicated by the detection positions Sd1 to Sd5 being "ON". For example, detection of the winding-side movable plate 69 by the winding-side sensor 151*a* is expressed as Sd1 ON. The case in which none of the winding-side sensors 151*a* to 151*e* detect the winding-side movable plate 69 is expressed as "None". In the winding setting information 15*c*, positions of the winding-side movable plate 69 are divided into seven stages corresponding to the detection states of the winding-side sensors 151*a* to 151*e*. These are the positions LE, LP2, LP1, TYP, HP1, HP2, and HE in ascending order.

The position LE is a position at which only the detection position Sd1 is "ON". The position LP2 is a position at which none of the detection positions Sd detect the winding-side movable plate 69. The position LP1 is a position at which only the detection position Sd2 is "ON", and the position TYP indicates a standard position of the winding-side movable plate 69 and can be referred to as a reference position of the winding-side movable plate 69. The position TYP is a position at which the detection position Sd2 and the detection position Sd3 are "ON". The position HP1 is a position at which the detection position Sd3 and the detection position Sd4 are "ON", and the position HP2 is a position at which only the detection position Sd4 is "ON". The position HE is a position at which only the detection position Sd5 is "ON". The control device 100 can determine which of the positions LE, LP2, LP1, TYP, HP1, HP2, and HE the position of the winding-side movable plate 69 is, based on the detection states of the winding-side sensors 151*a* to 151*e*.

The winding setting information 15*c* includes, as a control value of the winding amount, a value for adjusting the length of the print medium S transported in one transport operation in the intermittent transport. For example, when the winding-side movable plate 69 is at the position LP2, the control device 100 adds 200 mm to the standard value or the current set value for the winding amount.

The winding setting information 15*c* includes, as a control value of the winding speed, a value for adjusting the transport speed of the print medium S in the continuous transport mode. For example, when the winding-side movable plate 69 is at the position LP2, the control device 100 sets the winding speed to be 10% faster than the standard value or the current set value.

Furthermore, according to the winding setting information 15*c*, a transport stop is set in association with the position LE and the position HE. Specifically, in the winding setting information 15*c*, transport is set to be stopped in any of the print mode and the continuous transport mode when the winding-side movable plate 69 is at the position LE and it is at the position HE.

5. Operation of Printing Apparatus

Figure 9:
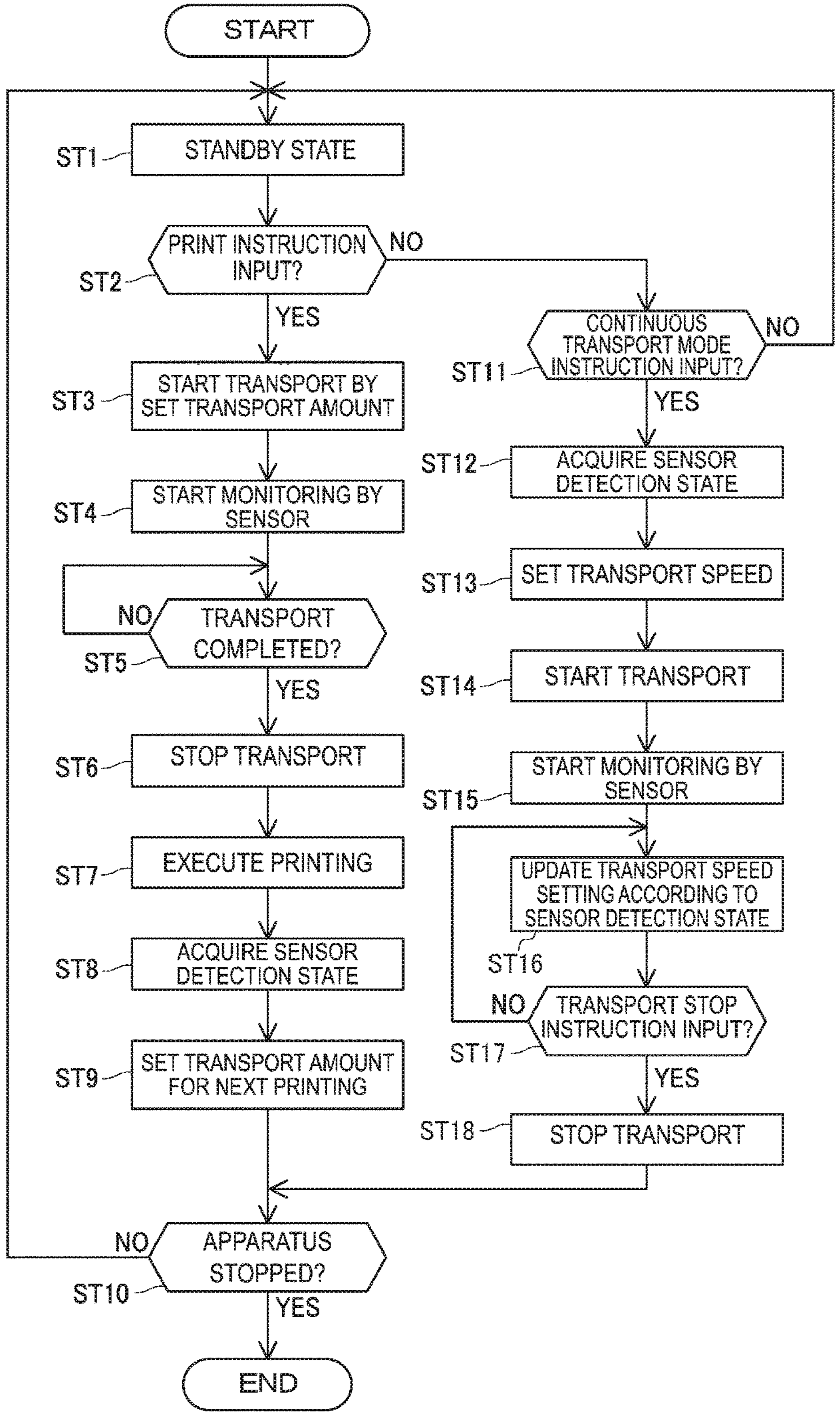
FIG. 9 is a flowchart illustrating an operation of the printing apparatus.

FIG. 9 is a flowchart illustrating an operation of the printing apparatus 1. The operation of FIG. 9 is executed under control of the control unit 13.

In a standby state, the printing apparatus 1 stands by for an input from the input device 17 (step ST1). The printing apparatus 1 determines whether a print instruction, that is, an instruction to start the print mode, has been input by the input device 17 (step ST2).

If a print instruction has been input (Step ST2; YES), the printing apparatus 1 starts the print mode and starts transporting the print medium S by the amount set in the operation setting information 15*a* (step ST3). In step ST3, one transport operation of intermittent transport is started. Here, the printing apparatus 1 starts monitoring by the feeding-side sensors 141 and the winding-side sensors 151 (step ST4). After step ST4, the printing apparatus 1 stops the transport of the print medium S when the detection state of the feeding-side sensors 141 is the state set to the transport stop in the feeding setting information 15*b*. Since this stop processing is realized as interrupt processing, it is not illustrated in the flowchart. When the transport of the print medium S is stopped, the control device 100 stops all of the motors M1 to M6 related to the transport of the print medium S.

The printing apparatus 1 determines whether one transport operation of the intermittent transport has been completed (step ST5), and continues the transport of the print medium S while the transport is not completed (step ST5; NO). When the transport is completed (step ST5; YES), the printing apparatus 1 stops the motors M1 to M6 to stop the transport of the print medium S (step ST6).

The printing apparatus 1 causes the ejection head 51, the first carriage motor M7, and the second carriage motor M8 to operate to perform printing (step ST7). In step ST7, an image is formed at the print medium S by the ejection head 51.

After formation of the image by the ejection head 51 is completed, that is, after printing is completed, the printing apparatus 1 acquires the detection states of the feeding-side sensors 141 and the detection states of the winding-side sensors 151 (step ST8). The printing apparatus 1 sets the transport amount of at least one of the feeding motor M1 or the feeding nip motor M2 and at least one of the winding nip motor M5 or the winding motor M6 when the next transport operation in the intermittent transport is performed based on the detection states acquired in step ST8 (step ST9).

In step ST9, the printing apparatus 1 refers to the feeding setting information 15*b* based on the detection states of the feeding-side sensors 141 and specifies the position of the feeding-side movable plate 67. The printing apparatus 1 acquires the control value of the feeding amount associated with the position of the feeding-side movable plate 67, adds or subtracts the control value to or from the set value of the operation setting information 15*a*, and updates the feeding amount of the operation setting information 15*a*.

Furthermore, in step ST9, the printing apparatus 1 refers to the winding setting information 15*c* based on the detection states of the winding-side sensors 151 and specifies the position of the winding-side movable plate 69. The printing apparatus 1 acquires the control value of the winding amount associated with the position of the winding-side movable plate 69, adds or subtracts the control value to or from the set value of the operation setting information 15*a*, and updates the winding amount of the operation setting information 15*a*.

The printing apparatus 1 determines whether to stop the printing apparatus 1 (step ST10). For example, when a stop of the printing apparatus 1 is instructed by the input device 17 (step ST10; YES), the operation is stopped. When the printing apparatus 1 is not stopped (step ST10; NO), the printing apparatus 1 returns to step ST1.

If no print instruction is input in the standby state (step ST2; NO), the printing apparatus 1 determines whether an instruction to start the continuous transport mode has been input (step ST11). Here, if no instruction to start the continuous transport mode has been input (step ST11; NO), the printing apparatus 1 returns to step ST1.

If an instruction to start the continuous transport mode has been input (step ST11; YES), the printing apparatus 1 acquires the detection states of the feeding-side sensors 141 and the detection states of the winding-side sensors 151 (step ST12). The printing apparatus 1 sets the transport speed in the continuous transport mode based on the detection states acquired in step ST12 (step ST13).

In step ST13, the printing apparatus 1 refers to the feeding setting information 15*b* based on the detection states of the feeding-side sensors 141 and specifies the position of the feeding-side movable plate 67. The printing apparatus 1 acquires the control value of the feeding speed associated with the position of the feeding-side movable plate 67, adds or subtracts the control value to or from the set value of the operation setting information 15*a*, and updates the feeding speed of the operation setting information 15*a*.

Furthermore, in step ST13, the printing apparatus 1 refers to the winding setting information 15*c* based on the detection states of the winding-side sensors 151 and specifies the position of the winding-side movable plate 69. The printing apparatus 1 acquires the control value of the winding amount associated with the position of the winding-side movable plate 69, adds or subtracts the control value to or from the set value of the operation setting information 15*a*, and updates the winding speed of the operation setting information 15*a*.

The printing apparatus 1 starts transporting the print medium S at the transport speed set in the operation setting information 15*a* (step ST14). In Step ST14, the printing apparatus 1 operates the feeding motor M1, the feeding nip motor M2, the winding nip motor M5, and the winding motor M6 at the feeding speed and the winding speed updated in step ST13. Furthermore, the supply nip motor M3 and the discharge nip motor M4 are operated at a predetermined speed.

The printing apparatus 1 starts monitoring with the feeding-side sensors 141 and the winding-side sensors 151 at the timing when the transport of the print medium S is started (step ST15). The printing apparatus 1 updates the settings of the transport speed based on the detection states of the feeding-side sensors 141 and the winding-side sensors 151 (Step ST16). After step ST14, the printing apparatus 1 stops the transport of the print medium S when the detection states of the feeding-side sensors 141 is the state set to the transport stop in the feeding setting information 15*b*. When the transport of the print medium S is stopped, the control device 100 stops all of the motors M1 to M6 related to the transport of the print medium S.

The printing apparatus 1 determines whether the instruction to stop the transport of the print medium S has been input by the input device 17 (step ST17), and if no instruction to stop the transport has been input (step ST17; NO), the printing apparatus continues the transport while updating the transport speed of the print medium S. That is, in the continuous transport mode, while the transport is continued so that the feeding-side movable plate 67 is positioned at the position TYP, the printing apparatus 1 acquires the detection states of the feeding-side sensors 141 at a preset cycle and refers to the feeding setting information 15*b* based on the acquired detection states to update the feeding speed in the operation setting information 15*a*. In addition, while the transport is continued so that the winding-side movable plate 69 is positioned at the position TYP, the printing apparatus 1 acquires the detection states of the winding-side sensors 151 at a preset cycle and refers to the feeding setting information 15*b* based on the acquired detection states to update the winding speed in the operation setting information 15*a*. This processing is executed in the same manner as in steps ST12 and ST13.

When the instruction to stop the transport is input (step ST17; YES), the printing apparatus 1 stops the motors M1 to M6 to stop the transport of the print medium S (step ST18), and proceeds to step ST10.

As described above, the printing apparatus 1 controls the feeding amount in the print mode and the feeding speed in the continuous transport mode based on the detection states of the feeding-side sensors 141. For this reason, it is possible to appropriately adjust the amount of slack of the print medium S in the feeding-side buffer unit 60 in accordance with the position of the feeding-side movable plate 67 in the feeding-side buffer unit 60. In the print mode, since the transport roller 318 transports the print medium S by a fixed amount in accordance with the print length in the printing unit 5, the feeding amount of the print medium S of the feeding-side roller strongly affects the amount of slack of the print medium S in the feeding-side buffer unit 60. In the continuous transport mode, the transport speed of the feeding-side roller with respect to the transport speed of the transport roller 318 strongly affects the amount of slack of the print medium S in the feeding-side buffer unit 60. Thus, by making the control target different in between the print mode and the continuous transport mode, the feeding amount in the print mode is controlled, the feeding speed in the continuous transport mode is controlled, and thus the amount of slack of the print medium S in the feeding-side buffer unit 60 can be efficiently adjusted. For example, when it is intended to speed up the transport speed of the print medium S in order to raise the printing speed of the printing apparatus 1, the ability of the feeding-side buffer unit 60 to keep up with operations of the feeding-side movable plate 67 is a task. According to the configuration of the printing apparatus 1, by controlling the transport amount of the print medium S in the print mode in which intermittent transport is performed, the position of the feeding-side movable plate 67 after the intermittent transport can be adjusted to an appropriate position. This control is simpler than a case in which the feeding speed is adjusted in accordance with the transport roller 318 and advantageous in that the ability of the feeding-side movable plate 67 to keep up with the feeding-side movable plate is not a large problem. Therefore, the printing speed of the printing apparatus 1 can be increased.

In the print mode, the control unit 13 detects displacement of the feeding-side movable plate 67 at a predetermined timing using the feeding-side sensors 141. The predetermined timing is, for example, a period from when the transport of the print medium S is stopped in step ST6 to when the print mode or the continuous transport mode is started next time, and is specifically step ST8. In addition, the predetermined timing is a timing at which the operation of forming an image on the print medium S by the printing unit 5 in step ST7 is completed. Accordingly, the feeding amount can be appropriately adjusted based on the detection states of the feeding-side sensors 141 with the displacement of the feeding-side movable plate 67 in the feeding-side buffer unit 60 being stopped.

In the continuous transport mode, the control unit 13 monitors the displacement of the feeding-side movable plate 67 using the feeding-side sensors 141 during the transport of the print medium S. For example, when the position of the feeding-side movable plate 67 is the position LE or the position HE, the transport of the print medium S can be stopped.

The printing apparatus 1 has a configuration in which the detection object 254D is attached to the feeding-side movable plate 67. By disposing the feeding-side sensors 141 on the feeding-side sensor mounting bar, the displacement of the feeding-side movable plate 67 can be reliably detected by the feeding-side sensors 141. The feeding-side sensor mounting bar may be configured similar to the winding-side sensor mounting bar 64 of FIG. 3, for example.

Since the feeding-side sensors 141 include the range R1 and the range R2, and more of feeding-side sensors 141 are disposed in the range R1 than in the range R2, a fine position of the feeding-side movable plate 67 can be detected in a range including an appropriate position of the feeding-side movable plate 67.

The printing apparatus 1 controls the winding amount in the print mode and the winding speed in the continuous transport mode based on the detected values of the winding-side sensors 151 in the winding-side buffer unit 61. Thus, the amount of slack of the print medium S can be appropriately adjusted also in the winding-side buffer unit 61.

6. Other Embodiments

The above embodiment is merely a specific example to which the present disclosure is applied. The present disclosure is not limited to the configuration of the above embodiment, and can be implemented in various aspects without departing from the gist of the disclosure.

For example, although the printing apparatus 1 has been described as having a configuration including the drying unit 7 in the above-described embodiment, the disclosure is also applicable to the printing apparatus 1 not having such a configuration. In addition, the printing apparatus 1 is not limited to an apparatus in which a continuous sheet wound around the roll body 32 is used as the print medium S, and an aspect of the continuous sheet can be arbitrarily changed.

In addition, although the inkjet printing apparatus 1 has been described in the above-described embodiment, this is an example, and the disclosure can be applied to printing apparatuses adopting other printing methods.

In addition, the numbers of transport rollers, first transport rollers, and second transport rollers, and the number of motors that drive the transport rollers described in the above embodiment are merely examples, and can be arbitrarily changed.

Although the ejection head 51 illustrated in the above embodiment is configured to move in the X-axis direction and the Y-axis direction on the print medium S supported by the platen 54 and eject ink to the entire print medium S, a so-called single-pass printing method in which the ejection head 51 has a length longer than the print medium S in the width direction, i.e., in the Y-axis direction and an image is formed by moving the ejection head 51 only once in the X-axis direction may be adopted.

7. Configurations Described Based on Embodiments

The following configurations are described based on the above embodiment.

Configuration 1

A printing apparatus including: a printing unit configured to form an image on a print medium, a feeding roller configured to feed the print medium toward the printing unit, a feeding-side movable roller in a feeding-side buffer region positioned between the feeding roller and the printing unit, the feeding-side movable roller being configured to apply tension to the print medium, a front drive roller that is positioned between the feeding-side buffer region and the printing unit and with which the print medium is intermittently transported, and a control unit configured to control feeding by the feeding roller, in which control amounts controlled by the control unit include a feeding amount and a feeding speed of the feeding by the feeding roller, and the control unit is configured to execute and switch between a print mode and a continuous transport mode, controls the feeding amount of the feeding roller when the print mode is executed, and controls the feeding speed of the feeding roller when the continuous transport mode is executed.

According to the printing apparatus of Configuration 1, the feeding amount of the feeding roller in the print mode and the feeding speed of the feeding roller in the continuous transport mode are controlled such that displacement of the feeding-side movable roller in the feeding-side buffer region is in an appropriate state. Thus, even when the transport speed of the print medium is increased, the amount of slack of the print medium in the transport path of the print medium can be appropriately adjusted with a simple configuration.

Configuration 2

The printing apparatus according to Configuration 1, in which a plurality of first sensors configured to detect displacement of the feeding-side movable roller are disposed in the feeding-side buffer region, and the control unit changes, of the control amounts, a control amount of the feeding roller based on a detection result of the first sensors.

According to the printing apparatus of Configuration 2, since the displacement of the feeding-side movable roller in the feeding-side buffer region is detected by the first sensors, the amount of slack of the print medium in the transport path of the print medium can be more appropriately adjusted.

Configuration 3

The printing apparatus according to Configuration 2, in which, in the print mode, the control unit detects the displacement of the feeding-side movable roller at a predetermined timing using the plurality of first sensors. According to the printing apparatus of Configuration 3, the displacement of the feeding-side movable roller is detected by the first sensors after the feeding-side movable roller is positioned at a stable position. Thus, the displacement of the feeding-side movable roller can be detected more accurately.

Configuration 4

The printing apparatus according to Configuration 3, in which the predetermined timing is a timing from when the displacement of the feeding-side movable roller is stopped to when the next transport of the print medium is started.

According to the printing apparatus of Configuration 4, since the displacement of the feeding-side movable plate is detected after the feeding-side movable plate is positioned at a stable position, the displacement of the feeding-side movable plate can be detected more accurately.

Configuration 5

The printing apparatus according to Configuration 3, in which the predetermined timing is a timing at which formation of the image by the printing unit is completed.

According to the printing apparatus of Configuration 5, since the displacement of the feeding-side movable roller is detected after the feeding-side movable roller is positioned at a stable position, the displacement of the feeding-side movable roller can be detected more accurately.

Configuration 6

The printing apparatus according to any one of Configurations 2 to 5, in which, in the continuous transport mode, the control unit monitors the displacement of the feeding-side movable roller using the plurality of first sensors during transport of the print medium.

According to the printing apparatus of Configuration 6, by monitoring the state of the slack of the print medium in the continuous transport mode, a situation that may cause contamination or the like of the print medium can be detected.

Configuration 7

The printing apparatus according to any one of Configurations 1 to 6, in which the feeding-side buffer region includes a feeding-side movable plate rotatably supporting the feeding-side movable roller, a detection object is attached to the feeding-side movable plate, and the plurality of first sensors are disposed at a feeding-side sensor mounting bar.

According to the printing apparatus of Configuration 7, since the detection object provided on the feeding-side movable plate is detected by the first sensors, the displacement of the feeding-side movable roller can be detected with a simple configuration.

Configuration 8

The printing apparatus according to Configuration 7, in which a first range including a proper position of the feeding-side movable roller and a second range outside the first range are set in the feeding-side buffer region, and more of the plurality of first sensors are disposed in the first range than in the second range.

According to the printing apparatus of Configuration 8, the displacement of the feeding-side movable roller can be detected more accurately in a configuration with a reduced number of first sensors.

Configuration 9

The printing apparatus according to any one of Configurations 1 to 8, further including: a winding roller configured to collect the print medium, a winding-side buffer region positioned between the winding roller and the printing unit, and a winding-side movable roller in the winding-side buffer region, the winding-side movable roller being configured to apply tension to the print medium, in which the control amounts controlled by the control unit include a winding amount and a winding speed in winding by the winding roller, and the control unit controls the winding amount when the print mode is executed and controls the winding speed when the continuous transport mode is executed.

According to the printing apparatus of Configuration 9, by controlling the winding amount in the print mode and the winding speed in the continuous transport mode based on the state of the amount of slack of the print medium in the winding-side buffer region, the amount of slack of the print medium on the winding side of the printing unit can be appropriately adjusted.

Configuration 10

The printing apparatus according to Configuration 9, in which a plurality of second sensors configured to detect displacement of the winding-side movable roller are disposed in the winding-side buffer region, and the control unit changes, of the control amounts, a control amount of the winding roller based on a detection result of the plurality of second sensors. According to the printing apparatus of Configuration 10, the state of the amount of slack of the print medium in the winding-side buffer region can be accurately determined and the amount of slack of the print medium can be adjusted.

Configuration 11

A control method for controlling a printing apparatus, the print apparatus including: a printing unit configured to form an image on a print medium, a feeding roller configured to feed the print medium toward the printing unit, a feeding-side movable roller in a feeding-side buffer region positioned between the feeding roller and the printing unit, the feeding-side movable roller being configured to apply tension to the print medium, and a front drive roller that is positioned between the feeding-side buffer region and the printing unit and with which the print medium is intermittently transported, the control method including: executing and switching between a print mode and a continuous transport mode, controlling a feeding amount in feeding by the feeding roller when the print mode is executed, and controlling a feeding speed in the feeding by the feeding roller when the continuous transport mode is executed.

According to the control method for a printing apparatus of Configuration 11, the feeding amount of the feeding roller in the print mode and the feeding speed of the feeding roller in the continuous transport mode are controlled such that displacement of the feeding-side movable roller in the feeding-side buffer region is in an appropriate state. Thus, even when the transport speed of the print medium is increased, the amount of slack of the print medium in the transport path of the print medium can be appropriately adjusted with a simple configuration.

What is claimed is:

1. A printing apparatus comprising:

a printing unit configured to form an image on a print medium;

a feeding roller configured to feed the print medium toward the printing unit;

a feeding-side movable roller in a feeding-side buffer region positioned between the feeding roller and the printing unit, the feeding-side movable roller being configured to apply tension to the print medium;

a front drive roller that is positioned between the feeding-side buffer region and the printing unit and with which the print medium is intermittently transported; and a control unit configured to control feeding by the feeding roller, wherein control amounts controlled by the control unit include a feeding amount and a feeding speed of the feeding by the feeding roller and the control unit is configured to execute and switch between a print mode and a continuous transport mode, controls the feeding amount of the feeding roller when the print mode is executed, and controls the feeding speed of the feeding roller when the continuous transport mode is executed.

2. The printing apparatus according to claim 1, wherein a plurality of first sensors configured to detect displacement of the feeding-side movable roller are disposed in the feeding-side buffer region and the control unit changes, of the control amounts, a control amount of the feeding roller based on a detection result of the plurality of first sensors.

3. The printing apparatus according to claim 2, wherein in the print mode, the control unit detects the displacement of the feeding-side movable roller at a predetermined timing using the plurality of first sensors.

4. The printing apparatus according to claim 3, wherein the predetermined timing is a timing from when the displacement of the feeding-side movable roller is stopped to when the next transport of the print medium is started.

5. The printing apparatus according to claim 3, wherein the predetermined timing is a timing at which formation of the image by the printing unit is completed.

6. The printing apparatus according to claim 2, wherein in the continuous transport mode, the control unit monitors the displacement of the feeding-side movable roller using the plurality of first sensors during transport of the print medium.

7. The printing apparatus according to claim 2, wherein the feeding-side buffer region includes a feeding-side movable plate rotatably supporting the feeding-side movable roller, a detection object is attached to the feeding-side movable plate, and the plurality of first sensors are disposed at a feeding-side sensor mounting bar.

8. The printing apparatus according to claim 7, wherein a first range including a proper position of the feeding-side movable roller and a second range outside the first range are set in the feeding-side buffer region and more of the plurality of first sensors are disposed in the first range than in the second range.

9. The printing apparatus according to claim 1, further comprising:

a winding roller configured to collect the print medium;

a winding-side buffer region positioned between the winding roller and the printing unit; and a winding-side movable roller in the winding-side buffer region, the winding-side movable roller being configured to apply tension to the print medium, wherein the control amounts controlled by the control unit include a winding amount and a winding speed in winding by the winding roller and the control unit controls the winding amount when the print mode is executed and controls the winding speed when the continuous transport mode is executed.

10. The printing apparatus according to claim 9, wherein a plurality of second sensors configured to detect displacement of the winding-side movable roller are disposed in the winding-side buffer region and the control unit changes, of the control amounts, a control amount of the winding roller based on a detection result of the plurality of second sensors.

11. A control method for controlling a printing apparatus, the print apparatus including:

a printing unit configured to form an image on a print medium, a feeding roller configured to feed the print medium toward the printing unit, a feeding-side movable roller in a feeding-side buffer region positioned between the feeding roller and the printing unit, the feeding-side movable roller being configured to apply tension to the print medium, and a front drive roller that is positioned between the feeding-side buffer region and the printing unit and with which the print medium is intermittently transported, the control method comprising:

executing and switching between a print mode and a continuous transport mode;

controlling a feeding amount in feeding by the feeding roller when the print mode is executed; and controlling a feeding speed in the feeding by the feeding roller when the continuous transport mode is executed.

* * * * *